May 6, 1930.  E. F. SILL ET AL  1,757,882
HOE
Filed Jan. 4, 1928
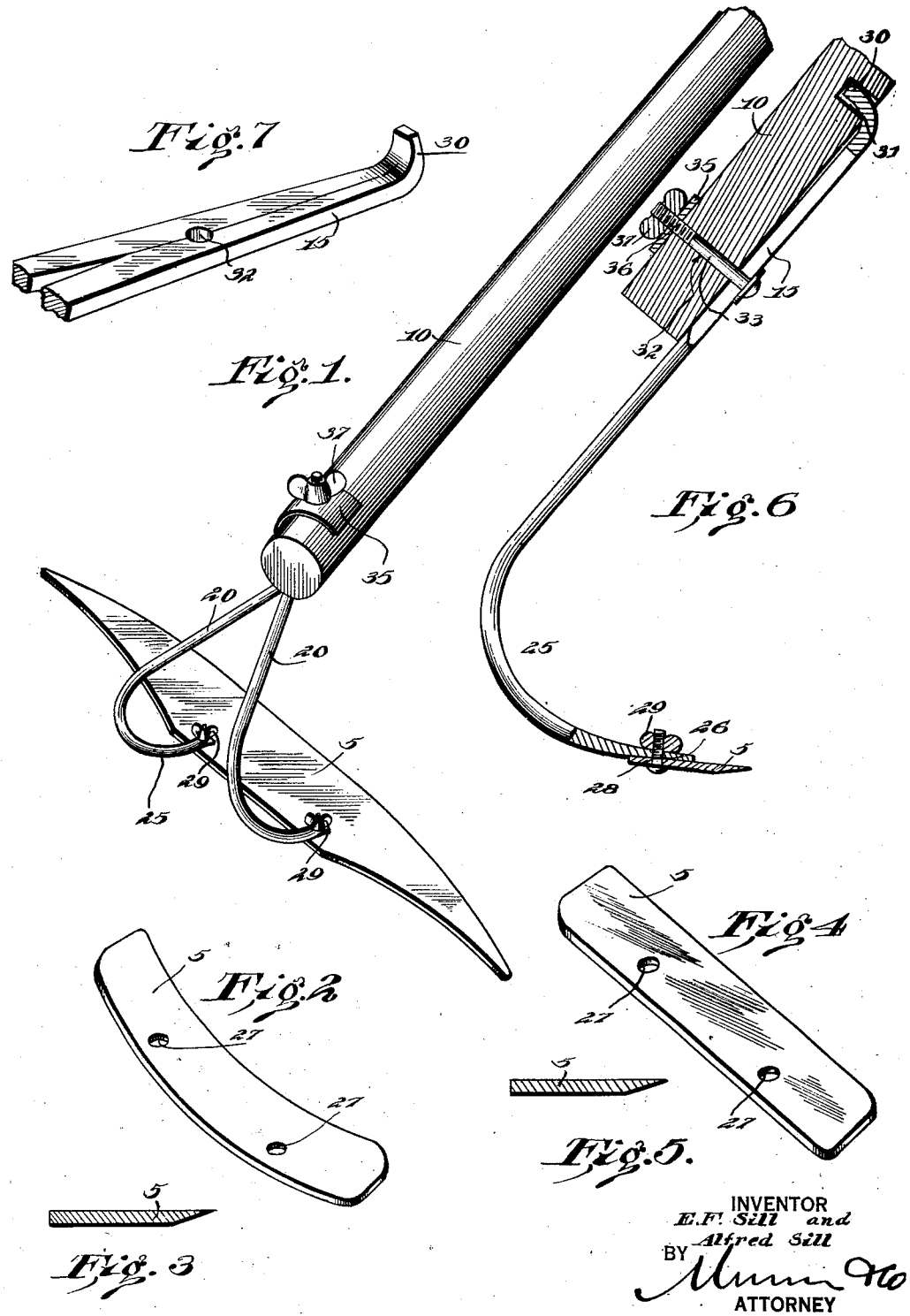
INVENTOR
E. F. Sill and
Alfred Sill
BY
ATTORNEY Patented May 6, 1930

1,757,882

UNITED STATES PATENT OFFICE

ERNEST F. SILL AND ALFRED SILL, OF DILLON, MONTANA

HOE

Application filed January 4, 1928. Serial No. 244,477.

Our invention relates to garden implements or hoes and an object thereof is to provide an implement of this character embodying a plurality of interchangeable blades for performing various garden operations such as weeding, digging roots and trenches.

Further the invention provides a strong and durable shank or connection between the blade and handle which will stand a maximum strain and is detachable from the handle to permit the former to be used in conjunction with handles of various lengths.

With the preceding and other objects and advantages in mind, the invention consists in the novel combination of elements, constructions and arrangements of parts to be hereinafter specifically referred to, claimed and illustrated in the accompanying drawings, wherein:

Figure 1 is a perspective of our improved garden implement and illustrating one of the various blades embodied in the invention;

Figure 2 is a perspective of another type of blade;

Figure 3 is a transverse sectional view of the same;

Figure 4 is a perspective of a third form of cutter embodied in the invention;

Figure 5 is a transverse sectional view of the same;

Figure 6 is a view partly in elevation and partly in section illustrating my improved detachable shank; and Figure 7 is an enlarged perspective view of the horizontal portion 15 of the shank.

Referring to the invention in detail a plurality of vari-shaped draw cut blades 5 for performing various garden operations such as weeding, thinning out plants and forming trenches, etc. is provided for attachment to a handle 10 of predetermined length.

To connect any one of the blades to the handle a longitudinal shank 15, bifurcated to afford a pair of divergent arms 20, is provided. These arms have their outer ends downwardly curved as at 25 and are formed with openings 26 for registration with openings 27 in the blades to receive screws 28 passed through these openings 27. Wing nuts 29 are engaged with the screws to hold the blade in place.

The shank extends along the under face of the handle and terminates at its inner end in a hook 30 which is engaged in a lateral opening 31 in the under face of the handle.

For the purpose of detachably securing the shank to the handle an opening 32 is provided in the shank to receive a bolt 33 which extends through a registering transverse opening 34 in the handle.

A longitudinally curved bearing plate 35 having a central opening 36 is received on the bolt 33 and embraces the handle. The bolt 33 is drawn in clamping engagement with the shank by a wing nut 37 engaged with this bolt and bearing against the bearing plate.

What is claimed is:

In a device of the character described, a handle having a recess in one face adjacent one end, a flat relatively wide shank formed from a single length of metal extending longitudinally of one face of the handle and terminating at its inner end in a lateral extension which lies within the recess, the shank being bifurcated from its outer end to the lateral extension to provide a pair of arms and further provided with a transverse opening which passes through the bifurcation in the shank, and a removable fastening passing through the transverse opening and handle to secure the shank thereto.

Signed at Dillon, in the county of Beaverhead and State of Montana, this 26th day of October, 1927.

ERNEST F. SILL.
ALFRED SILL.